United States Patent [19]

Kress

[11] 4,369,938

[45] Jan. 25, 1983

[54] FUEL TANK FOR MODEL AIRCRAFT

[76] Inventor: Robert W. Kress, 27 Mill Rd., Lloyd Harbor, N.Y. 11743

[21] Appl. No.: 92,222

[22] Filed: Nov. 7, 1979

[51] Int. Cl.³ .............................................. B64D 37/06
[52] U.S. Cl. ................................ 244/135 R; 46/76 R; 46/78
[58] Field of Search ...................... 244/135 R, 135 A; 137/43, 590, 587; 220/DIG. 29, 1 V, 85.5, 235; 222/481.5; 123/510; 180/284; 46/76, 78

[56] References Cited

U.S. PATENT DOCUMENTS

| 2,404,765 | 7/1946 | Valentyne | 244/135 R |
|---|---|---|---|
| 2,458,245 | 1/1949 | Bordelon | 244/135 R |
| 2,493,452 | 1/1950 | Grigg | 220/235 |
| 2,942,610 | 6/1960 | Klank et al. | 137/43 |
| 3,004,739 | 10/1961 | Bunting et al. | 46/78 |
| 3,156,441 | 11/1964 | Thorn | 244/135 R |
| 3,238,664 | 3/1966 | McDonald | 46/78 |
| 3,561,414 | 2/1971 | Schou | 244/135 R |
| 3,679,092 | 7/1972 | Sullivan | 244/135 R |

Primary Examiner—Galen L. Barefoot
Attorney, Agent, or Firm—Richard G. Geib

[57] ABSTRACT

A fuel tank for model aircraft having a central aperture on one end face for receiving a fuel line and a pair of nipples, one above and one below said central aperture near the top and bottom of the tank to which vent lines leading to the atmosphere through lower and upper surfaces of the aircraft are connected.

4 Claims, 5 Drawing Figures

FUEL TANK FOR MODEL AIRCRAFT

BACKGROUND OF THE INVENTION

The present invention relates to model aircraft and has particular reference to fuel tanks therefor.

Fuel tanks in wide use in today's model aircraft generally comprise a fuel container of plastic, such as polyethelene, to which fuel feed and air vent lines are connected. The fuel line usually includes a short length of flexible brass tubing which passes through an elastomeric stopper in a central opening in one end of the tank to which is connected a length of flexible tubing within the container. The end of the flexible tubing is weighted so that it follows and is submerged in the main body of the liquid fuel in all attitudes and accelerations of the aircraft.

Sullivan in U.S. Pat. No. 3,679,092 discloses a design which includes an obliquely angled tank wall portion designed to slant the stopper in order to facilitate mounting. Venting in Sullivan is accomplished by the addition of one or more rigidly angled vent lines protruding through the stopper into the tank body. Assembly of this device requires careful manipulation of the vent lines through the stopper opening and time consuming adjustments to make sure the vent lines are properly oriented.

Another available device includes the Kraft Hayes fuel tank which, although it eliminates the need for wriggling vent lines through the tank opening, provides no venting when the tank is in an inverted position. The Kraft Hayes unit also requires a precision tank opening to accommodate a metallic stopper fitting.

Metallic components, as used in both prior art devices have been found to be undesirable. Aside from adding unnecessary costs to the product, metallic parts tend to corrode badly in the presence of the typical model fuel mixtures used.

In my invention only a single plastic fuel line pierces the stopper. Vents are provided by a pair of nipples forming an integral portion of the tank wall, and protruding from the ends of tank, one nipple being near the top of the tank and the other being near the bottom of the tank. The upper nipple is connected to the atmosphere by tubing which leads to the outside of the aircraft through the bottom of the craft; the lower nipple is connected to tubing which leads to the atmosphere through the upper surface of the aircraft. Thus, the space above the liquid fuel will be vented to the atmosphere no matter where the aircraft is flying upright or inverted.

All metallic components have been eliminated thereby minimizing weight, cost and corrosion problems while providing a simple, durable and reliable fuel tank system.

It is, therefore, a principle object of the present invention to provide an improved model aircraft fuel tank which overcomes many of the problems of the prior art.

It is a more particular object of the present invention to provide an easily assembled fuel tank which can function reliably regardless of its angular orientation.

It is a further object of the present invention to provide a lightweight and inexpensive fuel tank which lends itself to mass production techniques and omits corrodible metallic parts.

These and other objects and advantages of the present invention are accomplished in the preferred embodiment of the invention by providing a fuel tank device having a molded fuel tank body having integral upper and lower vent nipples with a central aperture therebetween. A forward extension may also be included in the molded body to prevent shifting of the tank while permitting maximum fuel capacity.

Fuel tank stopper means have also been provided which require no manipulation to install and avoids the use of corrodible metallic parts.

Further aspects of the invention will become apparent from the following description taken in conjunction with the illustrated embodiments in the accompanying drawings.

BRIEF DESCRIPTION OF THE DRAWINGS

For a more complete understanding of the invention, reference may be had to the accompanying drawings in which.

DETAILED DESCRIPTION

Figure 2:
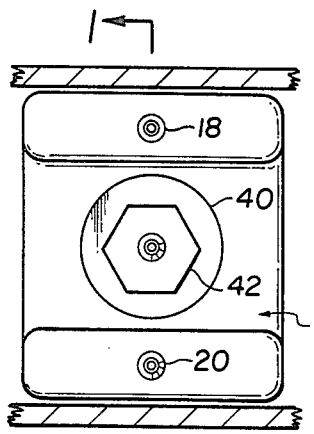
FIG. 2 is a head on view of FIG. 1.
Figure 1:
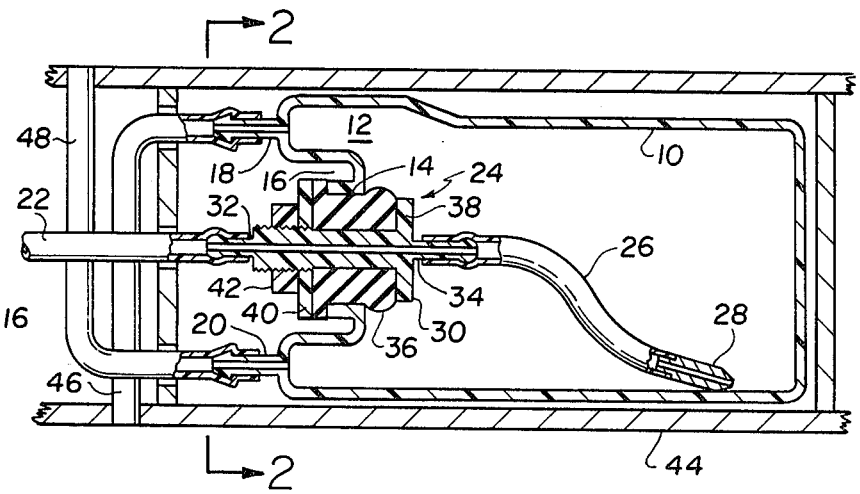
FIG. 1 is a fragmentary longitudinal section of the preferred embodiment of the tank installed in a model airplane.

As seen in the embodiment of FIG. 1, the fuel tank comprises a plastic envelope 10, substantially rectangular in longitudinal section with a 'bubble' 12 at the forward end and an aperture 14 in a recess 16 at the front face of the tank. Also on the front of the tank are the nipples 18 and 20, nipple 18 being near the top of the tank and nipple 20 being near the bottom of the tank. (The terms top and bottom refer to the tank in its normal attitude.)

A fuel line 22 is connected to the outer end of fitting 24 which is held securely in the aperture 14, while the other end of the fitting 24 is connected to a flexible tubing 26 inside the tank. The end of tubing 26 carries a weighted piece or "klunk" 28 to keep the end of the tubing 26 submerged in the fuel at all times.

The non-corrodible fitting 24 includes a central plastic piece 30 having an outer nipple 32 to which fuel feed line 22 is attached and an inner nipple 34 to which flexible fuel pick-up tubing 26 is connected.

An elastomeric stopper 36 surrounds the piece 30 and rests on the inner shoulder 38 thereof. The stopper 36 may be squeezed between the shoulder 38 and non-metallic washer 40 by tightening plastic nut 42, which is on the threaded end of the central piece 30. This permits sealing of the fitting 24 in the aperture 14 and prevents leakage of fuel around the fitting.

Figure 4:
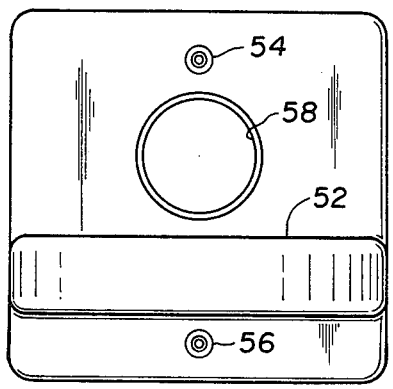
FIG. 4 is a head on view of FIG. 3.
Figure 3:
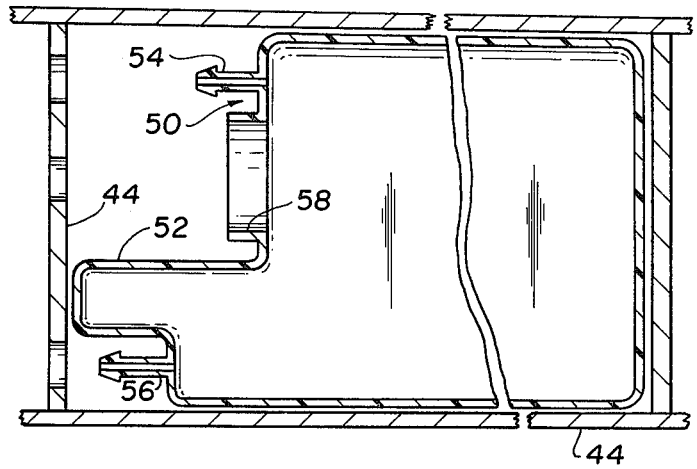
FIG. 3 is a partial longitudinal section of an alternative tank installed in a model airplane.
Figure 5:
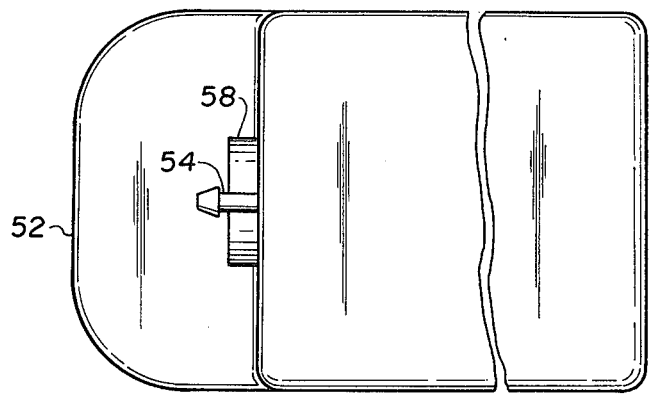
FIG. 5 is a top view of FIG. 3.

The tank 10 is installed in a model airplane, a portion of which is indicated by the structure 44 which surrounds the tank. The upper nipple 18 is connected to a vent line 46 which leads to the atmosphere through the bottom of the aircraft, while the lower nipple 20 is connected to a vent line 48 which leads to the atmosphere through the top of the aircraft. Thus, when the aircraft is flying upright, the tank is vented through nipple 18 and no fuel is lost from the tank through nipple 20. Similarly, when the aircraft is flying inverted, so that the tank is upside down, the nipple 20 is connected to the atmosphere for venting the tank and no fuel will be lost out of nipple 18. FIGS. 3, 4 and 5 show an alternative arrangement of the forward end of the tank 50 in which a protruding portion 52 of the tank 50 is provided to limit the forward motion of the tank 50 before hitting the structure 44 of the aircraft. This limitation of movement will prevent kinking of the fuel and vent lines due to tank forward motion in some installations while providing additional fuel capacity. Tank 50 is provided with upper and lower nipples 54 and 56, respectively, and a central aperture 58 into which the fitting 24 of FIG. 1 is inserted.

In use, the fuel conduit 22 is connected to the engine intake (not shown), and the vent lines are connected to the nipples 18 and 20 as shown. The tank may be filled with liquid without removing or disconnecting any portion of the assembly. Fuel may be introduced through vent line 48 and lower nipple 20, while the air in the tank is expelled through the upper vent 18. When the fuel is being burned in the engine, the tank is vented through nipples 18 and 20 as explained earlier.

What is claimed is:

1. A fuel tank for model aircraft, said tank comprising a hollow body having a top wall, a bottom wall, side walls, and first and second end walls, said fuel tank further comprising:
    an aperture for receiving a fuel feed line fitting in the first end wall substantially centrally located between the top and bottom walls, said fuel feed aperture having a substantially horizontal axis parallel to the longitudinal axis of said tank and normal to the planes of said end walls,
    a first vent aperture located in the first end wall near the top wall, and a second vent aperture located in the first end wall near the bottom wall, said vent apertures having a substantially horizontal axis parallel to the longitudinal axis of said tank and normal to the planes of said end walls,
    said first end wall of said hollow body of said tank having at least one protruding portion extending from side to side transversely of the longitudinal axis of said tank, said protruding portion forming an extension of the interior of said tank such that the fuel capacity thereof is increased thereby, said fuel line aperture being located rearwardly of said protruding portion.

2. The fuel tank as recited in claim 1 wherein said protruding portion of said tank body comprises a forward extending portion between said upper and lower nipples, said extension, in addition to allowing additional fuel capacity therein, also serves to contact aircraft structure such that undesired shifting of the fuel tank body within the aircraft is prevented.

3. A fuel tank system for a model aircraft having an engine, which system allows external refueling without disturbing fuel tank connections, said system comprising:
    a fuel tank with a hollow body having a top wall, a bottom wall, side walls, and first and second end walls disposed within the aircraft and having integral external upper and lower venting nipples and a fuel feed aperture therebetween in said first end wall of said body, said air venting nipples and fuel feed aperture having a substantially horizontal axis parallel to the longitudinal axis of said tank and normal to the planes of said end walls,
    said first end wall of said hollow body of said tank having at least one protruding portion extending from side to side transversely of the longitudinal axis of said tank, said protruding portion forming an extension of the interior of said tank such that the fuel capacity thereof is increased thereby, said fuel feed aperture being located rearwardly of said protruding portion,
    air venting port means disposed on the upper and lower surfaces of the aircraft and in fluid communication with said venting nipples such that said upper nipple is connected to venting port means on the lower aircraft surface, and said lower nipple is connected to venting port means on the upper aircraft surface, and
    a fuel tank stopper assembly sealably inserted within said fuel feed aperture and having a single central fuel passage therethrough, said assembly further including a first fluid conduit nipple portion extending into said tank body and connecting to a pick-up tube for receiving a quantity of fuel therethrough, and a second fluid conduit nipple portion protruding out of said body, said second portion being connectable to said aircraft engine for supplying fuel thereto.

4. The system as recited in claim 3 wherein said protruding portion of said tank body comprises a forward extending portion between said upper and lower nipples, said extension, in addition to allowing additional fuel capacity in said tank, also serves to contact aircraft structure such that undesired shifting of the fuel tank body within the aircraft is prevented.

* * * * *